Patented Apr. 26, 1949

2,468,393

UNITED STATES PATENT OFFICE 2,468,393

CHEWING GUM BASE

Frank W. Corkery, Crafton, and John W. Church, Mount Lebanon, Pa., assignors to Pennsylvania Industrial Chemical Corporation, Clairton, Pa., a corporation of Pennsylvania No Drawing. Application August 19, 1947, Serial No. 769,538

3 Claims. (Cl. 99—135)

This invention relates to a chewing gum base.

Chewing gum bases as commonly made up have included worked rubber, chicle, or both, to impart chewability. It has been recent practice to include in the composition of the chewing gum base a resin softening component to decrease toughness. With those chewing gum base ingredients there are included other conventional ingredients, such as paraffin wax, stearic acid, high boiling petroleum oils, and the like, to serve as smoothing agents, together with sugar, dextrose, flavoring, and frequently an edible oil.

Primarily the object of our invention is to provide a chewing gum base consisting only of a resin wholly suitable for inclusion in chewing gum, and wholly suitable to replace worked rubber and chicle, and worked rubber or chicle combined with the previously used thermoplastic resins such as hydrogenated rosin, coumarone-indene, and the like.

A more specific object of our invention is to provide a chewing gum base having a component of such high molecular weight that no worked rubber and chicle is necessary in the composition, and of such sort and so prepared that it is odorless and tasteless, can be softened readily to proper plastic consistency, and that is readily combinable with and in appropriate order is compatible with the conventional chewing gum ingredients.

Further objects of our invention are to provide a chewing gum base of the indicated sort the gum content of which has no substantial acid or iodine number and no saponification number, and which is either wholly or preponderantly hydrocarbon in its composition, and which is either highly resistant to or inert to oxidation.

In our chewing gum base we include as the high molecular weight resin component thereof a styrene resin, or the substituted styrene, methyl styrene resin melting within the approximate range of 160° C. to 225° C. (ball and ring). At the lower melting point range the resin is a resin of high molecular weight, and the upper limit of the range, namely 225° C., represents a melting point and molecular weight at which the resin is on the verge of losing thermoplasticity. Any styrene or methyl styrene resin within this range is of such high molecular weight that it serves to impart elastic properties to a blend in which it is included. The medium molecular weight resin of the composition is methyl styrene resin, having a melting point within the approximate range of 40° C. to 120° C. (ball and ring), and within such melting point range the medium molecular weight resin has a plasticizing effect on the resin of high molecular weight.

The medium molecular weight resin may readily be freed of taste and odor by steam distillation. It having been found impractical to steam distill styrene resin or methyl styrene resin melting within the approximate range of 160° C. to 225° C. (ball and ring), and particularly to steam distill the resins in the higher region of such melting point range, the lower molecular weight resin may be used so to permit steam distillation of the resin content as a whole as to provide a resin blend which is free from objectionable taste and odor, and which permits the desired flavor to be imparted to the chewing gum by the flavoring materials commonly in use. In so doing the high molecular weight styrene or methyl styrene resin polymers, following polymerization by which the resin is made, is introduced with its associated solvent into a still and the medium molecular weight resin is added to it. This provides a blended resin solution which after distillation of the solvent is steam distilled until the blend is freed of objectionable taste and odor.

The resin blend which is prepared in such manner, or which may otherwise be prepared if so desired, comprises from 50% to 85% of the methyl styrene resin of medium molecular weight, having a melting point in the approximate range of 40° C. to 120° C. (ball and ring) and 15% to 50% of high molecular weight styrene, or methyl styrene, resin having a melting point within the approximate range of 160° C. to 225° C. (ball and ring). Within those ranges different blends may be made to have in different order a softening point at various temperatures and to be of varied consistency, to accord with the particular desires of the trade or to specific conventional compositions which are selected for inclusion with them. An advantage incident to using the high molecular weight resin and the medium molecular weight resin in the form of a preformed blend is that such blend being of moderate melting point may be mixed with the other conventional ingredients of the composition at relatively low temperature.

Various chewing gum base compositions involving the use of high molecular weight styrene, or methyl styrene, resin in conjunction with medium molecular weight methyl styrene resin are exemplified by the following formulae in which the quantitative inclusion of the ingredients is given in parts by weight:

Formula No. 1

65 parts resin M. P. 100° C. (ball and ring) approx.—composed 20% of styrene resin M. P. 180° C., 80% methyl styrene resin M. P. 75° C.

25 parts hydrogenated methyl abietate.

20 parts paraffin wax M. P. 130° F. (drop on thermometer).

Relatively small proportions of conventional ingredients additional to the wax and oil, and other than rubber and chicle.

Formula No. 2

50 parts resin M. P. 100° C. (ball and ring) approx.—composed 18% of styrene resin M. P. 210° C., 82% of methyl styrene resin M. P. 50° C.

20 parts hydrogenated methyl abietate.

20 parts paraffin wax M. P. 130° F. (drop on thermometer).

Relatively small proportions of conventional ingredients additional to the wax and oil, and other than rubber and chicle.

Formula No. 3

65 parts resin M. P. 100° C. (ball and ring) approx.—composed 50 parts styrene resin M. P. 165° C., 50 parts methyl styrene resin M. P. 100° C.

25 parts hydrogenated methyl abietate.

25 parts paraffin wax M. P. 130° F. (drop on thermometer).

Relatively small proportions of conventional ingredients additional to the wax and oil, and other than rubber and chicle.

Formula No. 4

65 parts resin M. P. 100° C. (ball and ring) approx.—composed 20% of methyl styrene resin M. P. 180° C., 80% methyl styrene resin M. P. 75° C.

10 parts mineral oil (preferably "white" purified oil).

10 parts hydrogenated methyl abietate.

20 parts paraffin wax 130° F. (drop on thermometer).

Relatively small proportions of conventional ingredients additional to the wax and oil, and other than rubber and chicle.

Formula No. 5

65 parts resin M. P. 100° C. (ball and ring) approx.—composed 40% of methyl styrene resin M. P. 165° C., 60% of methyl styrene resin M. P. 80° C.

10 parts mineral oil (preferably "white" purified oil).

10 parts hydrogenated methyl abietate.

20 parts paraffin wax 130° F. (drop on thermometer).

Relatively small proportions of conventional ingredients additional to the wax and oil, and other than rubber and chicle.

Formula No. 6

65 parts resin M. P. 100° C. (ball and ring) approx.—composed 20% of methyl styrene resin M. P. 180° C., 80% of methyl styrene resin M. P. 75° C.

25 parts hydrogenated methyl abietate.

20 parts paraffin wax 130° F. (drop on thermometer).

Relatively small proportions of conventional ingredients additional to the wax and oil, and other than rubber and chicle.

Formula No. 7

65 parts resin M. P. 100° C. (ball and ring) approx.—composed 25% of styrene resin M. P. 210° C. and methyl styrene resin M. P. 180° C., blended in the proportion of 2 parts of styrene resin to 1 part of methyl styrene resin and 75% of methyl styrene resin M. P. 60° C.

10 parts mineral oil (preferably "white" purified oil).

15 parts hydrogenated methyl abietate.

15 parts paraffin wax 130° F. (drop on thermometer).

Relatively small proportions of conventional ingredients additional to the wax and oil, and other than rubber and chicle.

In connection with varient formulae it may be stated the blends made of high molecular weight resin toward the upper limit of the melting point range therefor, with a larger proportion of medium molecular weight resin in the lower region of the melting point range therefor tend to give a tougher composition at body temperature than when the diverse resins are closer in their melting points and are included in more nearly equal proportions.

In connection with the examples it should be borne in mind that many substitutions may be made for the various conventional ingredients of the total composition. Thus paraffin wax, petrolatum, and high boiling petroleum oils, stearic acid, palmitic acid, numerous other conventional ingredients of like sort, and to a certain extent edible oils such as olive oil, cottonseed oil, corn oil and the like, may be used as partial or complete equivalents for each other.

In blends which comprise high molecular weight styrene resin we have found it desirable to include a susbtantial proportion of a plasticizing oil of high solvent power, such as the various non-toxic ester plasticizing oils represented for example by methyl abietate (preferably but not necessarily hydrogenated), the non-toxic fatty acid esters, and the like. When used, such high solvent plasticizing oils serve to increase compatibility of the other conventional ingredients included in the composition, such as paraffin wax and other petroleum products, the edible oils and the like with the high molecular weight resin. We have found, however, that there is a tendency for high molecular weight methyl styrene resin to have compatibility with those conventional ingredients, and when the high molecular weight content of the blend is represented by methyl styrene resin, a plasticizing oil of high solvent power may be included in lesser quantity or even completely omitted without causing substantially increased evidence of incompatibility in the composition.

The chewing gum base of our invention is "rubberless" in that it requires no content of worked rubber or chicle, but possesses properties rendering it suitable in their absence. It is to be understood, however, that the resin blend may, if desired, be associated with worked rubber or chicle in an additive conjunction of chewing gum bases each complete in itself. Our invention thus primarily consists in using a styrene resin, consisting either of styrene resin proper, or a substituted styrene resin such as methyl styrene resin, falling within the melting point range of 160° C. to 225° C. as the high molecular weight component of the chewing gum base, brought to chewable consistency by being plasticized first with a medium molecular weight solvent therefor; that is, a solvent for the high melting styrene or methyl styrene resin which is a solid up to at least normal room temperature, before plasticizing further with a suitable oily non-evaporative plasticizer. The result of first plasticizing the high melting styrene resin with a solid solvent of such sort is to give a chewability closely approaching that of worked rubber or chicle when included in a composition with conventional ingredients. The medium molecular weight solvent, like the high melting resin, must of course be non-toxic, and relatively tasteless and odorless.

It will have been noted that the high-melting styrene resin and methyl styrene resin are considered to be full equivalents when used as the high molecular weight component of the composition. This is because the general properties of those resins are substantially identical and because the high styrene polymers as well as the high methyl styrene polymers are non-toxic when included in a chewing gum base. We have discovered, however, that the lower polymers of styrene have a toxicity that the lower polymers of methyl styrene do not possess. The use of methyl styrene resin rather than styrene resin as the medium molecular weight component of the composition is therefore to be considered as critical.

Although the mixing of higher and lower melting resins in chewing gum bases has been indicated in prior practice, our invention goes beyond such mere mixing or blending. In accordance with that invention, styrene resin and methyl styrene resin and mixtures of them, of critically high melting point, are plasticized with lower melting non-toxic methyl styrene resin to give a resin blend having rubber-like properties in such order as to render it independent of an associated rubber or chicle content when included in a chewing gum base.

Where proportions are given without qualification throughout the examples and elsewhere throughout the specification and claims they are to be taken as in parts by weight. Where throughout the specification and claims melting point is given without qualification it is to be taken as by the ball and ring method of melting point determination for resins.

It is to be understood that we do not intend to limit ourselves to the specific description and exemplifications of our invention hereinabove given in disclosing and embodying that invention, nor to the specific terms used in so doing, and that our invention is to be restricted only by the limitations placed thereon by the claims appended hereto.

The application herein is a continuation-in-part of our pending application Serial No. 549,791, filed August 16, 1944, now abandoned.

We claim as our invention:

1. A rubberless chewing gum base comprising conventional chewing gum base ingredients and a resin blend composed of a high molecular weight component selected from the group consisting of styrene resin and methyl-substituted styrene resin and mixtures of them melting within the approximate range of 160° C. to 225° C. and a medium molecular weight methyl styrene resin melting within the approximate range of 40° C. to 120° C., the said high molecular weight resin of the blend and the said medium molecular weight resin thereof being included in the approximate proportion of about 15% to 50% of the high molecular weight resin and 50% to 85% of the medium molecular weight resin.

2. A rubberless chewing gum base comprising conventional chewing gum base ingredients and a resin blend composed of high molecular weight styrene resin melting within the approximate range of 160° C. to 225° C. and medium molecular weight methyl styrene resin melting within the approximate range of 40° C. to 120° C., the said high molecular weight resin of the blend and the said medium molecular weight resin thereof being included in the approximate proportion of about 15% to 50% of the high molecular weight resin and 50% to 85% of the medium molecular weight resin.

3. A rubberless chewing gum base comprising conventional chewing gum base ingredients and a resin blend composed of high molecular weight methyl-substituted styrene resin melting within the approximate range of 160° C. to 225° C. and a medium molecular weight component composed of methyl styrene resin melting within the approximate range of 40° C. to 120° C., the said high molecular weight resin of the blend and the said medium molecular weight resin thereof being included in the approximate proportion of about 15% to 50% of the high molecular weight resin and 50% to 85% of the medium molecular weight resin.

FRANK W. CORKERY.
JOHN W. CHURCH.

REFERENCES CITED

The following references are of record in the file of this patent:

UNITED STATES PATENTS

| Number | Name | Date |
| --- | --- | --- |
| 2,197,240 | Hatherell | Apr. 16, 1940 |
| 2,273,425 | Traylor | Feb. 17, 1942 |
| 2,284,804 | DeAngelis | June 2, 1942 |
| 2,357,811 | Corkery et al. | Sept. 12, 1944 |
| 2,366,086 | Carmody | Dec. 26, 1944 |